(12) United States Patent
Dragon et al.

(10) Patent No.: US 8,205,740 B2
(45) Date of Patent: Jun. 26, 2012

(54) PNEUMATIC CONVEYOR FOR CONTAINERS

(75) Inventors: Christoph Dragon, Neutraubling (DE); Markus Sigler, Köfering (DE); Andreas Seidl, Donaustauf (DE); Christian Paul, Pentling (DE)

(73) Assignee: Krones AG, Neutraubling (DE)

( * ) Notice: Subject to any disclaimer, the term of this patent is extended or adjusted under 35 U.S.C. 154(b) by 74 days.

(21) Appl. No.: 11/951,667

(22) Filed: Dec. 6, 2007

(65) Prior Publication Data

US 2008/0149465 A1    Jun. 26, 2008

(30) Foreign Application Priority Data

Dec. 20, 2006   (DE) .......................... 10 2006 060 110

(51) Int. Cl.
*B65G 47/84* (2006.01)

(52) U.S. Cl. ............... 198/466.1; 198/836.1; 198/836.3; 198/836.4; 406/86

(58) Field of Classification Search ............... 198/466.1, 198/836.1, 836.2, 836.3, 836.4; 406/86, 406/87, 88
See application file for complete search history.

(56) References Cited

U.S. PATENT DOCUMENTS

| | | | | |
|---|---|---|---|---|
| 2,229,605 A * | 1/1941 | Snyder et al. | ............... | 198/836.3 |
| 3,289,867 A * | 12/1966 | Burke | ...................... | 414/416.06 |
| 3,308,927 A * | 3/1967 | Cunningham | ............. | 198/836.1 |
| 3,527,336 A * | 9/1970 | Johnston | ................... | 198/836.3 |
| 5,246,314 A | 9/1993 | Smith et al. | | |
| 5,682,977 A * | 11/1997 | White | ........................ | 198/860.5 |
| 6,050,396 A * | 4/2000 | Moore | ........................ | 198/836.3 |
| 6,244,429 B1 * | 6/2001 | Drewitz et al. | ............. | 198/836.3 |
| 6,360,880 B1 * | 3/2002 | Ouellette | .................... | 198/836.1 |
| 6,368,027 B1 | 4/2002 | Trenel et al. | | |
| 6,378,695 B1 * | 4/2002 | Rinne | ........................ | 198/836.3 |
| 6,612,785 B1 * | 9/2003 | Ouellette | ........................ | 406/88 |
| 6,827,203 B2 * | 12/2004 | Andreoli et al. | ........... | 198/836.3 |
| 6,843,367 B1 * | 1/2005 | Gentile et al. | ............. | 198/861.1 |
| 6,890,128 B2 | 5/2005 | Seidl et al. | | |
| 7,210,572 B2 * | 5/2007 | Ingraham | .................... | 198/836.3 |
| 2006/0093443 A1 * | 5/2006 | Lanfranchi | ...................... | 406/88 |
| 2006/0180430 A1 | 8/2006 | Ingraham | | |
| 2007/0114112 A1 | 5/2007 | Guenther | | |

FOREIGN PATENT DOCUMENTS

DE        29501098.3        4/1995

(Continued)

OTHER PUBLICATIONS

European Search Report based on European Patent Application No. 07 02 0559; Date of Mailing Apr. 8, 2008.

*Primary Examiner* — Gene Crawford
*Assistant Examiner* — William R Harp
(74) *Attorney, Agent, or Firm* — Marshall, Gerstein & Borun LLP (57) ABSTRACT

A conveyor device for containers having a receiving rail for receiving a neck area of the containers, the containers being held by the receiving rail and are movable within this receiving rail. Guide mechanisms are provided with guide elements that are arranged beneath the receiving rail and guide the movement of the containers. The guide elements are movable in the longitudinal direction of the containers and the movements in the longitudinal direction of the containers of a plurality of different guide elements are mechanically linked to one another.

10 Claims, 4 Drawing Sheets

FOREIGN PATENT DOCUMENTS

| | | |
|---|---|---|
| DE | 29617148 U 1 | 10/1997 |
| DE | 29902470 U1 | 9/1999 |
| DE | 20102557 U1 | 10/2001 |
| DE | 20112256 U | 12/2002 |
| DE | 69912646 T | 9/2004 |
| DE | 60022910 T | 7/2006 |
| EP | 1409385 A1 | 4/2004 |
| WO | WO-03/006347 A1 | 1/2003 |
| WO | WO-2004/067420 A1 | 8/2004 |
| WO | WO 2004/067420 A1 | 8/2004 |
| WO | WO-2004/096680 A1 | 11/2004 |
| WO | WO 2004/096680 A1 | 11/2004 |
| WO | WO-2004/099042 A1 | 11/2004 |
| WO | WO 2004099042 A1 * | 11/2004 |

* cited by examiner

PNEUMATIC CONVEYOR FOR CONTAINERS

CROSS-REFERENCE TO RELATED APPLICATION

The present application claims the benefit of priority of International Patent German Patent Application No. 10 2006 060 110.6, filed Dec. 20, 2006. The entire text of the priority application is incorporated herein by reference in its entirety.

FIELD OF THE DISCLOSURE

The present disclosure relates to a conveyor device for containers. The disclosure is described with reference to a conveyor device in which plastic containers, e.g., PET bottles, are conveyed, and includes in particular such conveyor devices in which the containers are conveyed by means of air pressure.

BACKGROUND

Such conveyor devices usually have a receiving rail with which a neck of the container to be guided engages. The containers are moved with respect to this receiving rail by means of air pressure acting on the upper areas of the containers.

It is also known from the state of the art that the lower areas of the containers and/or their bodies can be guided at the sides in particular to prevent extreme swaying or wobbling of the containers during conveyance.

WO 2004/099042 A1 describes a conveyor section having adjustable guide rails and an actuator drive. The lateral distance of the adjustable rails can be adjusted by means of this actuator drive and thus there can be an adjustment to containers of different diameters. This device has an air conduction box, which is constantly supplied with air by several fans arranged so they are offset in the direction of conveyance.

However, it is often desirable to be able to adjust these adjustable rails for guiding the containers not only to the diameter of the containers but also to be able to displace them in the longitudinal direction of the containers and/or in the height of the containers. It is possible in this way to make an adjustment to different container heights. It should be noted that, depending on the height of the containers, different heights at which the respective adjustable guide rails are arranged may also be desirable for ideal guidance.

WO 2004/067420 A1 discloses a conveyor device for plastic containers. This conveyor device and/or the rails for the containers are displaceable in the longitudinal direction of the containers and/or in the height of the containers. However, the individual guide devices are each displaced separately by independent adjusting mechanisms. This leads to a great complexity in manufacturing and operation because a number of adjusting mechanisms that are independent of one another, including hydraulic cylinders and the like, must be provided.

It is described in WO 2004/067420 that even two guide devices opposing one another with respect to the direction of conveyance of the containers can be adjusted in a coupled arrangement, but this does not yield any significant savings in terms of drive complexity because a plurality of such guide elements must be arranged along the guide section of the containers to be able to raise or lower a railing as a whole. In addition, the coupling mechanism described in WO 2004/067420 for the opposing guide mechanism is very complicated and access is very difficult.

EP 1 409 385 B1 and DE 299 02 470 U1 describe pneumatic conveyors of the generic type which are also known.

SUMMARY OF DISCLOSURE

The object of the present disclosure is therefore to simplify the design of generic conveyor devices and in particular to simplify the adaptability or convertibility to different bottle shapes and sizes. The mechanical complexity for such devices is to be reduced in particular. This is achieved according to this disclosure by conveyor devices.

The disclosed conveyor device for containers has a receiving rail for receiving a neck area of the containers. The containers (in their longitudinal direction and/or in this neck area) are held here by the receiving rail and can be moved within this receiving rail.

In addition, lateral guide devices are also provided which are arranged beneath the receiving rail and guide the movements of the containers. These guide devices have guide elements which can be moved at least partially in the longitudinal direction of the containers and/or in the height of the containers.

According to this disclosure, several guide elements are provided in the direction of movement of the containers so they are opposite one another with respect to the receiving rail, and the movements of these guide elements in the longitudinal direction of the containers are at least partially interlinked.

However, guide devices are understood to refer not exclusively to the entire guide mechanisms, i.e., the guide rails and the guide elements, for example. The rails are preferably also displaced in the longitudinal direction of the containers due to the movement of the guide elements.

Preferably at least one area of the conveyor device can be acted upon by a gaseous medium, air in particular, to move the containers with respect to the receiving rail.

Due to the coupling of several such guide elements, which are arranged one after the other in the direction of movement of the containers, it is possible to uniformly control the movement of a plurality of such guide elements by means of a few drive mechanisms and/or a few motors and thus perform a height adjustment of all the guide devices using comparatively few drive mechanisms. Another point to be considered is that a uniform height adjustment of the respective guide devices is sufficient because uniform container sizes are usually conveyed in conveyor equipment.

For example, the height adjustment of all the guide devices may be varied uniformly by manual input by a user, for example. It would also be possible to provide several standard height settings, each of which could be approached and/or set by means of a pushbutton or the like.

The present disclosure is also directed at a conveyor device of the type defined above in which at least two guide elements are opposite one another in pairs with regard to the containers and the movements of these guide elements in the longitudinal direction of the containers are linked to one another by a coupling element, whereby this coupling element is arranged above the receiving rails and preferably also above a housing for the device.

Thus, with this embodiment, there is a coupling of two guide elements arranged opposite one another at the sides with respect to the containers, and due to the arrangement of the coupling element above the receiving rail, the coupling mechanism can be simplified in comparison with the state of the art and may be equipped with a smaller number of movement transfer elements with the same conveyor length. In addition, the coupling element above the receiving rail is more readily accessible for repair purposes.

The manufacturing complexity and thus also the production complexity and cost of the generic conveyor equipment can thus be greatly simplified through the two inventive embodiments.

The movements (the movements in the longitudinal of the containers) of at least two guide elements arranged one after the other in the direction of movement of the containers are preferably mechanically linked to a coupling mechanism.

The movements of a plurality of guide elements arranged one after the other in the direction of movement of the containers are preferably linked to one another. A coupling mechanism is understood here to refer to any coupling mechanism which couples the movements of two bodies to be coupled in a synchronizing manner.

The coupling mechanism preferably has a drive rail which is movable in the longitudinal direction of the receiving rail. Due to the movement of this drive rail, the movement of the guide elements in the longitudinal direction of the containers can be linked by the movement of these drive rails via different mechanical elements that are described in greater detail below.

The drive rails are preferably arranged above the receiving rail and thus also above the containers to be guided.

In another advantageous embodiment, movement rods are provided on the guide elements and a movement of the drive rail is converted into movements of the individual movement rods by means of a plurality of coupling mechanisms. In other words, the movement of the drive rail in the direction of the guide rail is converted by means of coupling elements such as toothed racks, gear wheels and the like into a movement of the movement rods in the longitudinal direction of the containers, i.e., a vertical movement. To this end, gear wheels may be used, but it would also be possible to use rubber wheels, for example, or the like for transferring the movement. The movement rods are preferably mechanically linked to the guide elements. Instead of movement rods, however, belts, chains or the like may also be used for conversion of the types of movement.

The longitudinal directions of the individual movement rods preferably extend in the longitudinal direction of the containers. However, it would also be possible for the longitudinal directions of these movement rods to be inclined with respect to the longitudinal direction of the containers. These movement rods are advantageously designed at least partially at toothed racks.

In another advantageous embodiment, the drive rail also has at least partially toothed racks. The movement is thus transferred via gear wheel elements in this embodiment.

In another advantageous embodiment, a drive means that moves the drive rail is provided. This may preferably be an electric motor which also displaces the drive rail with respect to the receiving rail via a gear wheel drive. Due to the inventive coupling, it is possible to move a plurality of movement rods in the longitudinal direction of the containers in a coupled action by means of a single driving means, for example, i.e., an electric motor. For example, it is possible to move five or more movement rods that are arranged one after the other in the direction of movement of the containers so that they move in synchronization with one another. The driving rail preferably runs in a straight line, but it would also be possible for the drive rail to assume a slight curvature. Multiple drive rails may also be arranged one after the other so they are linked to one another and their movements are also linked by additional coupling elements. Such a coupling may also be accomplished over curved paths.

Individual guide elements are preferably interconnected via a rod which, as mentioned above, is the guide rod that causes the containers to also be guided between the individual guide elements. It is thus possible, for example, for four or more guide elements to act on one rod and for their movements to be controlled uniformly in the longitudinal direction and/or height of the containers.

In another advantageous embodiment, the guide elements can be moved in an additional direction, whereby this additional direction is essentially perpendicular to the direction of movement of the containers and the longitudinal direction of the containers. This direction of movement is thus based on a direction running in the direction of the diameter of the containers to thereby adapt the device to containers having different diameters.

The present disclosure is also directed at a method for conveying containers, whereby the containers are gripped by a guide rail in a neck area of the containers and are conveyed by pneumatic pressure along this guide rail. The containers are guided by a plurality of guide mechanisms arranged at the side with respect to the containers, whereby these guide mechanisms have guide elements, and the longitudinal movements of at least two guide elements arranged one after the other in the direction of movement of the containers are linked to one another mechanically.

BRIEF DESCRIPTION OF THE DRAWINGS

Additional advantages and embodiments are derived from the accompanying drawings, in which.

DETAILED DESCRIPTION

Figure 1:
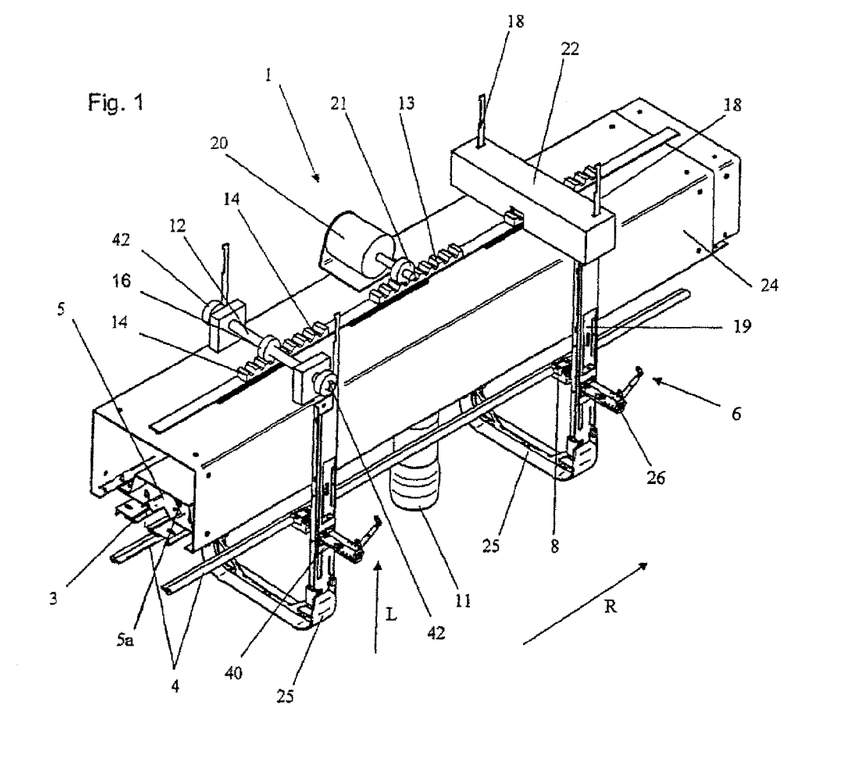
FIG. 1 shows a schematic diagram of a disclosed pneumatic conveyor.

FIG. 1 shows schematically an inventive device 1 for conveying containers. This device 1 has a receiving rail 3 in which the containers are guided so they are freely suspended. More precisely, in their head area the containers, e.g., plastic bottles 11, usually have a circumferential collar, which is guided in the receiving rail 3. The receiving rail 3 is accommodated in a housing 24. This housing may be supplied with air by means of fan mechanisms (not shown).

An air guide element 5 is provided above the receiving rail 3. This air guide element 5 has opening slots 5a which are inclined in a certain preferable direction, depending on the direction in which the containers are to be conveyed when acted upon by compressed air.

Reference numeral 6 refers as a whole to a guide mechanism for lateral guidance of the containers 11. The guide mechanism 6 is arranged on the right side with respect to the containers in the direction of movement R of the containers. This guide mechanism 6 has guide elements 8 on which are arranged guide railings 4. FIG. 1 shows another guide mechanism 7 arranged at the left side, partially concealed by the housing 24. This shows only the guide railing 4 of this guide mechanism 7 on the left side.

The guide elements 8 and accordingly the guide elements 9 on the left side (not shown) are displaceable in the vertical direction and/or in the longitudinal direction L within guide rails 19. In this way there can be a height adjustment of the entire guide mechanisms 6, 7.

In general, the height adjustment is thus achieved with the help of actuator units, which are installed centrally, e.g., spaced a distance of 10 meters apart in the direction of conveyance. The height adjustment here may be performed manually, mechanically or electrically using positioning motors.

Reference numeral 26 refers to a pneumatic multiposition cylinder. This multiposition cylinder allows a plurality of positions to vary the lateral spacing of the guide mechanisms 6, 7 and/or the guide railings 4 in relation to one another for adapting to different container diameters. This multiposition cylinder 26 is also displaceable in the longitudinal direction L jointly with the guide element 8.

Reference numeral 14 identifies a drive rail designed here as a toothed rack. This drive rail is mechanically connected to a motion transfer rail 13. This motion transfer rail 13 is also movable in the direction of movement R of the containers. It is moved by a drive mechanism 20, which may be an electric motor, e.g., a stepping motor. To this end, the drive mechanism 20 has a drive wheel 21, which is designed as a wheel with partial gearing. The motion of the drive rail 14 created in this way is in turn transferred to a gear wheel 16, inducing a rotational movement in a coupling element 12 connected thereto in a rotationally fixed manner.

This rotational movement is in turn transferred to vertically displaceably guided motion rods 18, which thus move in the longitudinal direction L of the containers 11, with drive wheels 42 arranged on the outside in a rotationally fixed manner. This movement in longitudinal direction L is transferred directly to the guide mechanisms 6, 7 connected to the motion rods, thereby achieving a height adjustment.

The height adjustment of the guide mechanism 6 on the right side and the guide mechanism 7 on the left side is mechanically coupled by the coupling element 12. A mechanical coupling of two guide mechanisms 6 arranged one after the other and/or two guide elements 8 is achieved by coupling the drive rails 14 in their movement in the direction R to the motion transfer rail 13. Reference numeral 22 refers to a covering housing for covering the drive rail 14, the coupling element 12 and the gear wheel 16.

The reference numeral 25 refers to transverse braces. These transverse braces here connect the guide rails 19 at their lower end and thus increase the stability of the system as a whole.

Figure 2:
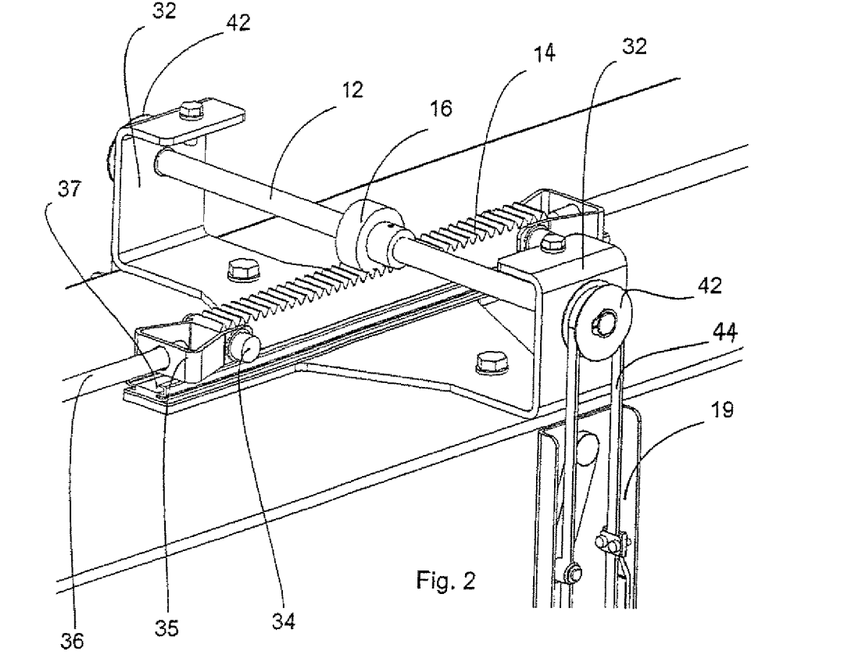
FIG. 2 shows a detailed drawing of a disclosed device for conveying containers.

FIG. 2 shows a detailed diagram of the disclosed drive mechanism in another embodiment. It can be seen here that the drive rail 14 has protrusions 34 extending laterally on the right and left sides. A coupling mechanism 35 is attached to these protrusions 34 and a coupling rod 36 is in turn attached to this coupling mechanism 35. The drive rail 14 may be connected to this coupling rod with another drive rail 14 or with the motion transfer rail 13 which is provided with a drive mechanism 20. The drive rail 14 is displaceable in a sliding element and/or a rail 37.

It can be seen that movements to a relatively limited extent are possible due to the design of the wheel 16 which has only partial gearing. However, this movement is sufficient to achieve the required height adjustment. The coupling element 12 which is designed like a shaft is guided in receiving elements 32 on the right and left sides. In the embodiment shown in FIG. 2, these receiving elements are each connected to the guide rail 37. A rotational movement of the coupling element 12 is transferred to one right and one left drive wheel 42 on the right and left sides, respectively, and this movement is in turn transferred to a belt 44 or a chain. However, a toothed belt is preferred.

Figure 3:
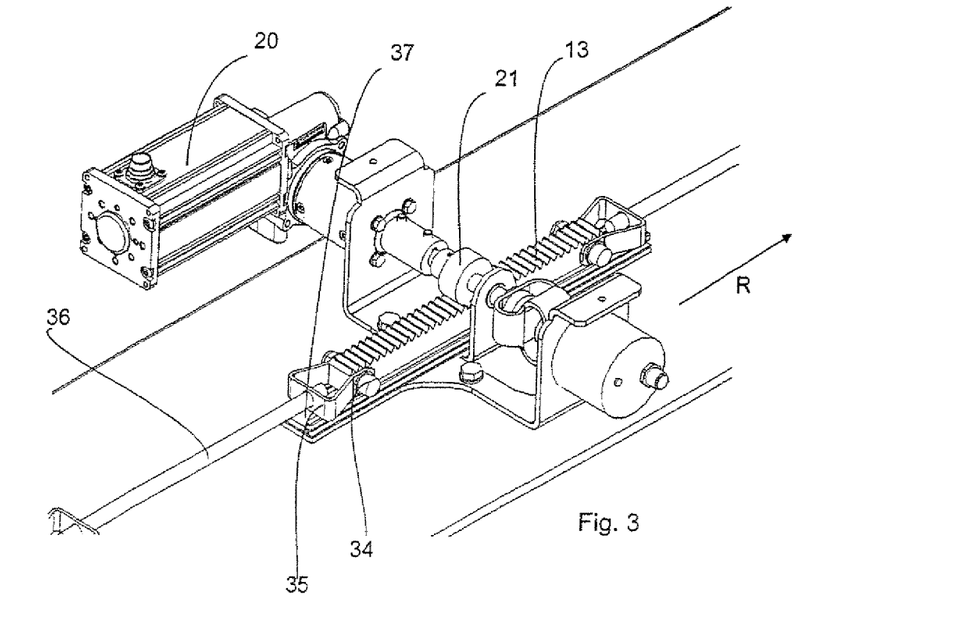
FIG. 3 shows a drive for a disclosed device.

FIG. 3 shows a detailed diagram of a drive mechanism for a disclosed device. A drive motor 20 induces a rotational movement in a drive wheel 20, optionally via a gear. This rotational movement causes a displacement of the motion transfer rail 13, e.g., in the direction R. This motion is transferred in the direction R to the drive rails 14 which are shown above and are at a distance from the drive motor via a coupling mechanism 34, 35, 36 already described above.

Figure 4:
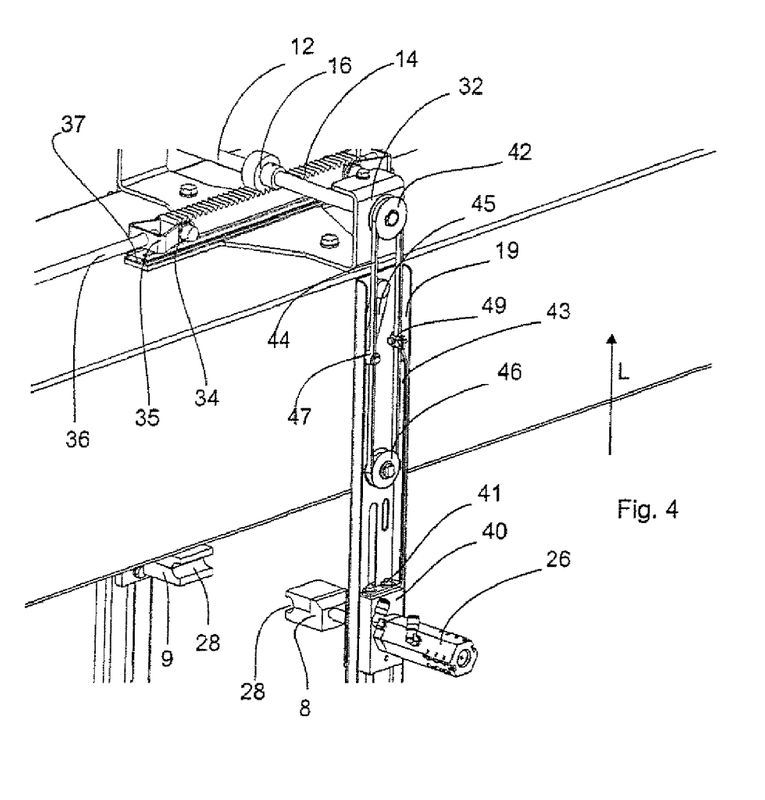
FIG. 4 shows an inventive mechanism for adjusting the height of the guide elements.

FIG. 4 shows a detailed diagram of the height-adjusting mechanism. As mentioned above, the gear wheel 16 and the coupling element 12, which is connected in a rotationally fixed manner, are both rotated by a movement of the drive rail 14. This rotation is transferred to a drive wheel 42. Depending on the direction of rotation of this drive wheel, a clamping mechanism 49 which connects the belt 44 to a connecting rod 43, is raised or lowered. Reference numeral 46 refers to a driven wheel which is mounted so it can rotate freely on the guide rail 19. This driven wheel 46 and the drive wheel 42 are connected to one another by the belt 44.

The connecting rod 43 is connected via screw connections 41 to a carriage 40 which is displaceably guided in the direction L in the guide rail 19. In this way the rotational motion of the drive wheel 42 is transferred into a displacement motion in the direction L. The cylinders 26 and the guide elements 8 and/or 9 are in turn arranged on the carriage 40. The reference numeral 28 refers to a receiving recess for the guide railing 4.

The reference numeral 47 characterizes a tension element arranged on a tension lever 45 to hold the belt 44 in a taut position. The driven wheel 46 is also arranged on the guide rail 19.

Those skilled in the art will recognize the fact that in addition to the embodiments shown here, other motion transfer means are also conceivable to achieve a rotational motion of the wheel 42 in displacement of the carriage 40 in the longitudinal direction L. It would thus be possible, for example, to use a tension cable that raises the carriage with rotation of the wheel 42 in a certain direction. Lowering of the carriage could take place by means of gravitational force, for example, or by means of additional spring elements.

Figure 5:
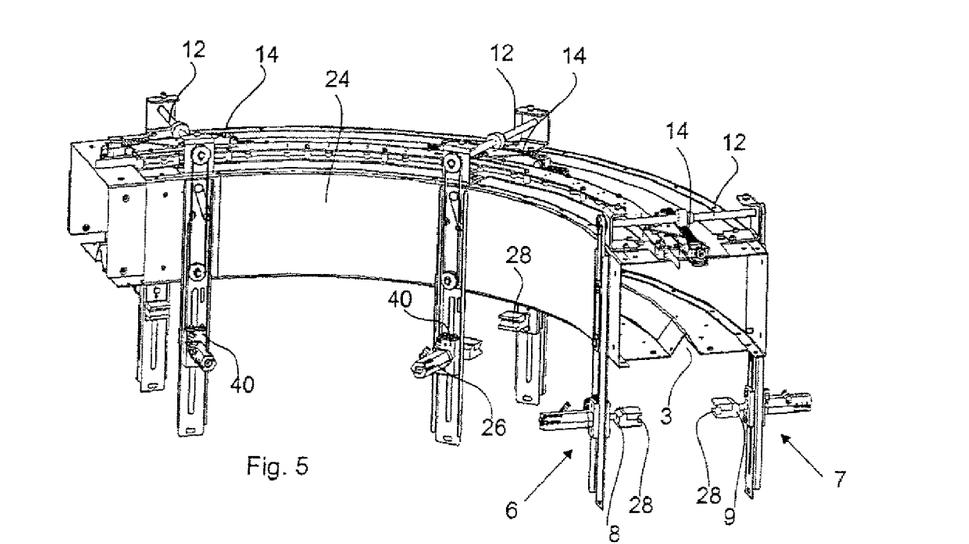
FIG. 5 shows a curved section of a disclosed device for conveying containers.

FIG. 5 shows a curved section of a disclosed pneumatic conveyor. Here again, this shows the housing 24 on which the guide rail 3 (shown only schematically) is situated. In the embodiment shown in FIG. 5, a total of three drive rails 14 can be seen for the height adjustment. The individual height adjustments operate in the same way as that described with reference to FIG. 4 and are therefore not described in detail again below.

By means of coupling rods, it is possible to connect the individual drive rails 14 to one another so that by means of a drive mechanism (not shown) the height adjustments of all drive mechanisms shown in FIG. 5 can be synchronized with one another. A guide rod (curved) may in turn be inserted into the recesses 28. Here again, cylinders 26 allow a lateral adjustment and/or an adaptation to different container diameters. Despite the curvature of the pneumatic conveyor, the individual drive rails 14 can be coupled by means of the coupling rods described above.

Figure 6:
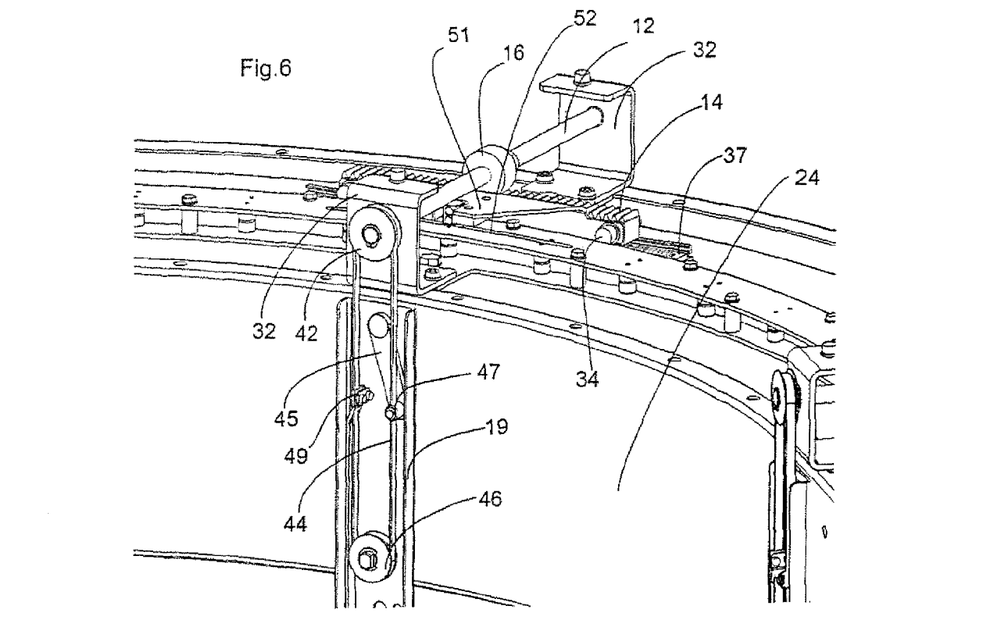
FIG. 6 shows a detailed diagram from FIG. 5.

FIG. 6 shows a detailed diagram of the device from the FIG. 5. It can be seen here that the drive rail 14 is also designed in a straight line in this embodiment and runs in a guide rail 37, which is also in a straight line. The drive rail 14 is connected to a guide plate 51. This guide plate 51 is in turn guided in a guide groove 52 to stabilize the movement. The height adjustment mechanism is designed in the same way as shown in FIG. 4 and therefore will not be described in greater detail here.

Figure 7:
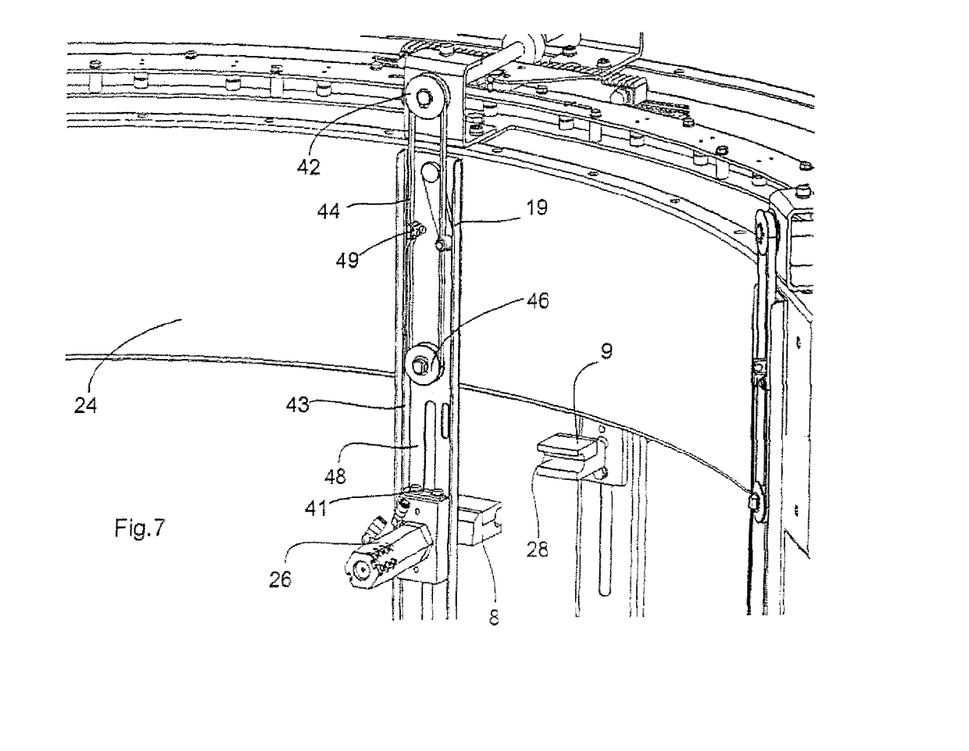
FIG. 7 shows a detailed diagram from FIG. 5.

FIG. 7 shows a detailed diagram of the height adjustment mechanism. Here again, the driven wheel 46 is arranged on the guide rail 19, and the height adjustments of the guide elements 8, 9 can be synchronized with respect to one another by means of a movement of the belt 44.

Figure 8:
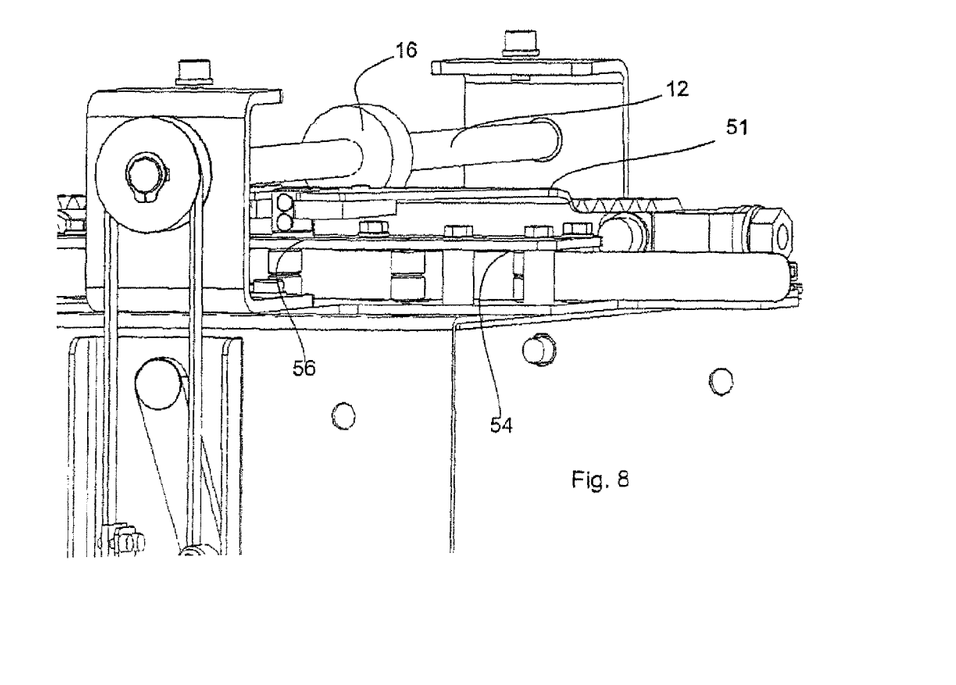
FIG. 8 shows a detailed diagram of a device from FIG. 5.

FIG. 8 shows a detailed diagram of the drive mechanism from FIG. 5. It can be seen here that the guide plate 51 has an engagement element 56 which engages in the guide groove 52 shown in FIG. 6. This guide groove 52 is in turn arranged in a groove holder 54.

By means of the device according to the disclosure, the installation and adjustment can be performed even by less trained personnel in particular due to the mechanical triggering of the height adjustment. The actuator cylinders 26 and/or the multiposition cylinder are means that are already known from the state of the art for adjusting lateral guide railings. A combination of this multiposition cylinder with the inventive height adjustment is possible in a simple manner. In addition the inventive device may be combined with variants of conveyors known from the state of the art and in particular with known housings. Finally, through the disclosed device a continuous adjustment of various height settings and/or settings in the longitudinal direction of the containers is also possible. In the simplest case, a manual height adjustment would even be possible. There is preferably a motorized height adjustment via a potentiometer setting with container type markings or scales.

All the features disclosed in the patent application documents are claimed as essential to the disclosure inasmuch as they are novel individually or in combination in comparison with the state of the art.

The invention claimed is:

1. Conveyor device for containers, comprising:
   a receiving rail for receiving a neck area of the containers, the containers being held by the receiving rail and movable within the receiving rail;
   lateral guide mechanisms arranged beneath the receiving rail for guiding the movement of the containers laterally, the guide mechanisms having guide elements movable at least partially in a longitudinal direction (L) of the containers, with several of the guide elements provided in a direction of movement (R) of the containers with respect to the receiving rail and the movements of the several guide elements in the longitudinal direction (L) of the containers being mechanically linked to one another;
   guide railings disposed on opposite sides of the receiving rail and connected to the guide elements, the guide railings also movable at last partially in the longitudinal direction (L) of the containers;
   at least one cylinder associated with each guide mechanism for varying a lateral spacing of the guide railings, the at least one cylinder comprising a multi-position cylinder that is displaceable in the longitudinal direction (L) of the container, thereby accommodating containers of different diameters, and
   a coupling mechanism having a drive rail which is movable in a longitudinal direction of the receiving rail and wherein this drive rail is arranged above the receiving rail and has at least partially toothed racks,
   wherein the movements of at least two guide elements that are arranged one after the other in the direction of movement (R) of the containers are linked to one another by the coupling mechanism.

2. Conveyor device according to claim 1, further comprising motion rods provided on the guide mechanisms, and a plurality of coupling elements, wherein a movement of the drive rail is converted into movements of the individual motion rods with the help of the plurality of coupling elements.

3. Conveyor device according to claim 2, wherein the longitudinal directions of the individual motion rods extend in the longitudinal direction (L) of the containers.

4. Conveyor device according to claim 1, further comprising a drive means which moves the drive rail.

5. Conveyor device according to claim 1, wherein the guide elements are movable in a direction, generally perpendicular to the direction of movement (R) of the containers and the longitudinal direction (L) of the containers.

6. Conveyor device according to claim 1, wherein at least one cylinder associated with each guide mechanism for varying a lateral spacing of the guide railing, the at least one cylinder comprising a multi-position cylinder that is displaceable in the longitudinal direction of the containers, thereby accommodating containers of different diameters.

7. Conveyor device according to claim 1, further comprising multiple drive rails and coupling elements, wherein the multiple drive rails are arranged one after the other so that they are linked to one another and their movements are also linked by the coupling elements.

8. Conveyor device according to claim 1, wherein a sliding element is provided and the drive rail runs in the sliding element.

9. Conveyor device for containers, comprising:
   a receiving rail for receiving a neck area of the containers, the containers being held by the receiving rail and movable within the receiving rail;
   a coupling element being arranged above the receiving rail;
   lateral guide mechanisms arranged beneath the receiving rail for guiding the movement of the containers laterally, the guide mechanisms having guide elements movable at least partially in a longitudinal direction (L) of the containers, with at least two guide elements being opposite one another in pairs with respect to the containers and the movements of the guide elements in the longitudinal direction (L) of the containers being linked to one another mechanically by the coupling element;
   guide railings disposed on opposite sides of the receiving rail and connected to the guide elements, the guide railings also movable at last partially in the longitudinal direction (L) of the containers; and
   a coupling mechanism having a drive rail which is movable in a longitudinal direction of the receiving rail and wherein this drive rail is arranged above the receiving rail and has at least partially toothed racks,
   wherein the movements of at least two guide elements that are arranged one after the other in the direction of movement (R) of the containers are linked to one another by the coupling mechanism.

10. Method for conveying containers, comprising:
    synchronously moving mechanically linked guide elements of guide mechanisms into a desired position along a longitudinal direction (L) of the containers, the guide elements arranged one after the other in a direction of movement (R) of the containers, and connected together by guide railings disposed on opposite sides of the containers;
    varying a lateral spacing of the guide railings with at least one cylinder associated with each of the guide mechanisms, the at least one cylinder comprising a multiposition cylinder that is displaceable in the longitudinal direction (L) of the containers to accommodate containers of different diameters;
gripping the containers with a guide rail in a neck area of the containers;
moving the containers with an air flow along the guide rail; and
guiding the containers with the guide railings of the guide mechanisms arranged at the sides with respect to the containers,
wherein the movements of at least two guide elements that are arranged one after the other in the direction of movement (R) of the containers are linked to one another by a coupling mechanism,
wherein the coupling mechanism has a drive rail which is movable in a longitudinal direction of the receiving rail and wherein this drive rail is arranged above the receiving rail and has at least partially toothed racks.

* * * * *